US006559442B1

(12) United States Patent
Pierrejean

(10) Patent No.: US 6,559,442 B1
(45) Date of Patent: May 6, 2003

(54) HIGH-PRESSURE OPERATION OF A FIELD-EMISSION COLD CATHODE

(75) Inventor: Didier Pierrejean, Villaz (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/551,563

(22) Filed: Apr. 18, 2000

(30) Foreign Application Priority Data

Apr. 22, 1999 (FR) ........................................... 99 05089

(51) Int. Cl.7 .......................... B01D 59/44; H01J 49/04
(52) U.S. Cl. .................... 250/288; 250/423 R; 250/427
(58) Field of Search ............................ 250/288, 423 R, 250/427

(56) References Cited

U.S. PATENT DOCUMENTS

| | | | | |
|---|---|---|---|---|
| 3,786,268 A | | 1/1974 | Nomura | |
| 3,786,305 A | | 1/1974 | Komoda et al. | |
| 3,887,835 A | | 6/1975 | Nomura | |
| 5,386,115 A | * | 1/1995 | Freidhoff et al. | 250/281 |
| 5,491,375 A | * | 2/1996 | Iwasaki | 313/409 |
| 5,747,815 A | * | 5/1998 | Young et al. | 250/423 R |
| 6,175,120 B1 | * | 1/2001 | McGregor et al. | 250/370.13 |
| 6,281,626 B1 | * | 8/2001 | Nakamura et al. | 313/311 |

FOREIGN PATENT DOCUMENTS

| | | |
|---|---|---|
| DE | 2 212 424 A | 9/1972 |
| EP | 0 601 533 A | 6/1994 |
| EP | 0 884 762 A1 | 12/1998 |
| FR | 1 520 972 A | 7/1968 |
| FR | 2 714 208 A1 | 6/1995 |
| JP | 01 05 4639 A | 3/1989 |
| JP | 07 06 5696 A | 3/1995 |
| JP | 09 28 3065 A | 10/1997 |

OTHER PUBLICATIONS

Das J. H. et al.: "Micromachined Field Emission Cathode with an Integrated Heater", Journal of Vacuum Science and Technology: Part B. vol. 13, NR. 6, pp. 2432–2435 XP000558316 ISSN: 0734–211X.

* cited by examiner

*Primary Examiner*—John R. Lee
*Assistant Examiner*—Anthony Quash
(74) *Attorney, Agent, or Firm*—Sughrue Mion, PLLC

(57) ABSTRACT

A system in accordance with the invention which generates electrons by means of a field-emission cathode comprises an array of electron-emitting micropoints associated with a grid and carried by a substrate with integral heater means for heating the micropoints to a temperature in the range approximately 300° C. to approximately 400° C. and maintaining them at that temperature during emission of electrons. The cathode can therefore function at higher residual air pressures with no risk of breakdown.

15 Claims, 2 Drawing Sheets

HIGH-PRESSURE OPERATION OF A FIELD-EMISSION COLD CATHODE

The present invention relates to gas detecting or measuring methods and devices in which a flow of electrons is generated in a vacuum enclosure from a field-emission cathode including an array of electron-emitting micropoints associated with a grid. The electrons are directed into an ionization cage containing the gas to be analyzed and generate a flow of ions which is then analyzed by a processor such as a mass spectrometer.

BACKGROUND OF THE INVENTION

Electron generators including field-emission cathodes with electron-emitting micropoints were first developed a few years ago. In such devices, electrically conductive micropoints are formed on an appropriate conductive substrate and occupy cavities in an insulative layer covering the substrate, with their ends flush with a positively biased grid having openings facing each cavity. The sharp tips of the micropoints cause local amplification of the electric field, which encourages the emission of electrons at ambient temperature and enables such emission from a threshold voltage in the order of 50 to 100 volts, depending on the nature of the array of micropoints. A mass spectrometer associated with a field-emission cold cathode with micropoints is described in Document EP-A-0 884 762. A second cathode which has a thermal emission filament refines the analysis of the gases by producing two spectra for resolving ambiguities.

Of the available means for generating a flow of electrons in a vacuum enclosure, field-emission cathodes, also known as cold cathodes, have significant advantages over conventional sources in the form of a tungsten filament heated to a temperature from 1000° C. to 2000° C.

In particular, field-emission cathodes have very high energy efficiency because the micropoints emit electrons at ambient temperature, whereas tungsten filaments require a high input of electrical energy to heat them to a temperature at which electrons can be emitted by a thermo-electronic effect; the orders of magnitude of the powers involved are approximately 10 watts for a heated filament and approximately 0.2 watts for a field-emission cathode.

Field-emission cathodes also have the advantage of a fast response time, both at the beginning of emission of electrons and at the end of emission; it is therefore possible to de-activate them instantaneously, unlike a tungsten filament whose temperature and corresponding emissive properties decrease only slowly, because of its thermal inertia.

Field-emission cathodes also have the advantage of generating a directional electron beam, because they emit all the electrons perpendicularly to the surface of the array of micropoints, unlike a filament, which emits electrons in all directions around the filament.

The absence of heat dissipation is another advantage of field-emission cathodes, avoiding interference with surrounding temperature-sensitive electronic circuits.

Field-emission-cathodes operate correctly when the residual gas pressure in the vacuum enclosure is below approximately $10^{-5}$ hPa. However, producing and maintaining a sufficiently low residual pressure in the vacuum enclosure requires appropriate pumping means and, most importantly, a sufficiently long pumping time. This is a drawback in gas analysis or detection applications, in which the electron generator is used in an enclosure in which a vacuum is established intermittently: it is necessary to wait for a sufficiently hard vacuum to be obtained before carrying out the analysis or measurement.

There is therefore a requirement to operate at residual gas pressures greater than $10^{-5}$ hPa and which can be obtained in shorter times and with simpler means.

However, for a given bias voltage between the cathode and the grid, the flow of electrons produced by field-emission cathodes decreases as the residual gas pressure in the vacuum chamber increases. The increased residual gas pressure in the vacuum enclosure requires the cathode bias voltage to be increased to obtain a given flow of electrons. Accordingly, gas detector or measuring devices generally increase the grid bias voltage to compensate for a reduction in productivity, in terms of electron flow, in the presence of a high residual gas pressure. However, the service life of field-emission cathodes is found to decrease very quickly as the residual gas pressure in the vacuum enclosure increases. If the field-emission cathode operates in an atmosphere with a residual gas pressure greater than $10^{-5}$ hPa, progressive localized deterioration is caused by breakdown (discharges between the micropoints and the grid), with a high risk of generalized breakdown and of explosion, caused by the micropoints melting.

OBJECTS AND SUMMARY OF THE INVENTION

The problem addressed by the present invention is that of designing means of reducing the risks of breakdown of field-emission cathodes used in gas detector or measuring devices for a given geometry of the array of micropoints and for a given flow of emitted electrons.

The present invention stems from the surprising observation that, for the same flow of emitted electrons, the risk of breakdown is significantly decreased if the micropoints of the field-emission cathode are heated.

This result is surprising because heating intensifies molecular motion and would appear at first sight to increase the risk of breakdown; similarly, intentional heating of the micropoints would appear at first sight to be cumulative with the heating effect of localized microdischarges.

The present invention exploits this observation to solve the problem of breakdown of field-emission cathodes operating at pressures higher than $10^{-5}$ hPa by proposing a gas detector or measuring device including a vacuum enclosure containing an anode forming an ionization cage for generating an outflow of ions, a processor for discriminating and measuring ions in the outflow of ions, and a field-emission cathode with an array of electron-emitting micropoints associated with a grid and generating an incoming flow of electrons into the anode, the detector further including heater means for heating the micropoints to a temperature higher than ambient temperature and maintaining them at that temperature during emission of electrons.

The heater means can advantageously be adapted to heat the micropoints to a temperature greater than approximately 300° C. and to maintain them at that temperature during emission of electrons.

Good results have been obtained by heating the micropoints to a temperature in the range approximately 300° C. to approximately 400° C. and maintaining them at that temperature during emission of electrons.

In an advantageous embodiment of the invention the micropoints are carried by a substrate incorporating the heater means.

For example, the heater means are resistive heating elements accommodated in the substrate near the micropoints and are adapted to be connected to an electrical power supply.

An electron generator of the above kind can function with a field-emission cathode housed in a vacuum enclosure where there is a residual gas pressure higher than $10^{-5}$ hPa.

The processor can be a mass spectrometer, for example.

Heating the micropoints to a temperature in the range approximately 300° C. to approximately 400° C. preserves the same flow of electrons with a lower bias voltage, avoiding breakdown of the cathode. It has been possible in this way to achieve a residual gas pressure of $10^{-4}$ hPa in the vacuum enclosure using the same field-emission cathode geometry.

Accordingly, the invention provides a method of detecting or measuring gases using a vacuum enclosure containing an anode forming an ionization cage for generating an outflow of ions, a processor for discriminating and measuring ions of the outflow of ions and a field-emission cathode with an array of electron-emitting micropoints associated with a grid and generating an incoming flow of electrons into the anode, wherein the micropoints are at a temperature higher than ambient temperature during emission of electrons, preferably a temperature greater than 300° C., for example in the range approximately 300° C. to approximately 400° C.

An intermittent vacuum is generally produced in the enclosure in a gas detecting or measuring method of the above kind.

BRIEF DESCRIPTION OF THE DRAWINGS

Other objects, features and advantages of the present invention emerge from the following description of particular embodiments of the invention, which is given with reference to the accompanying drawings, in which.

MORE DETAILED DESCRIPTION

Figure 2:
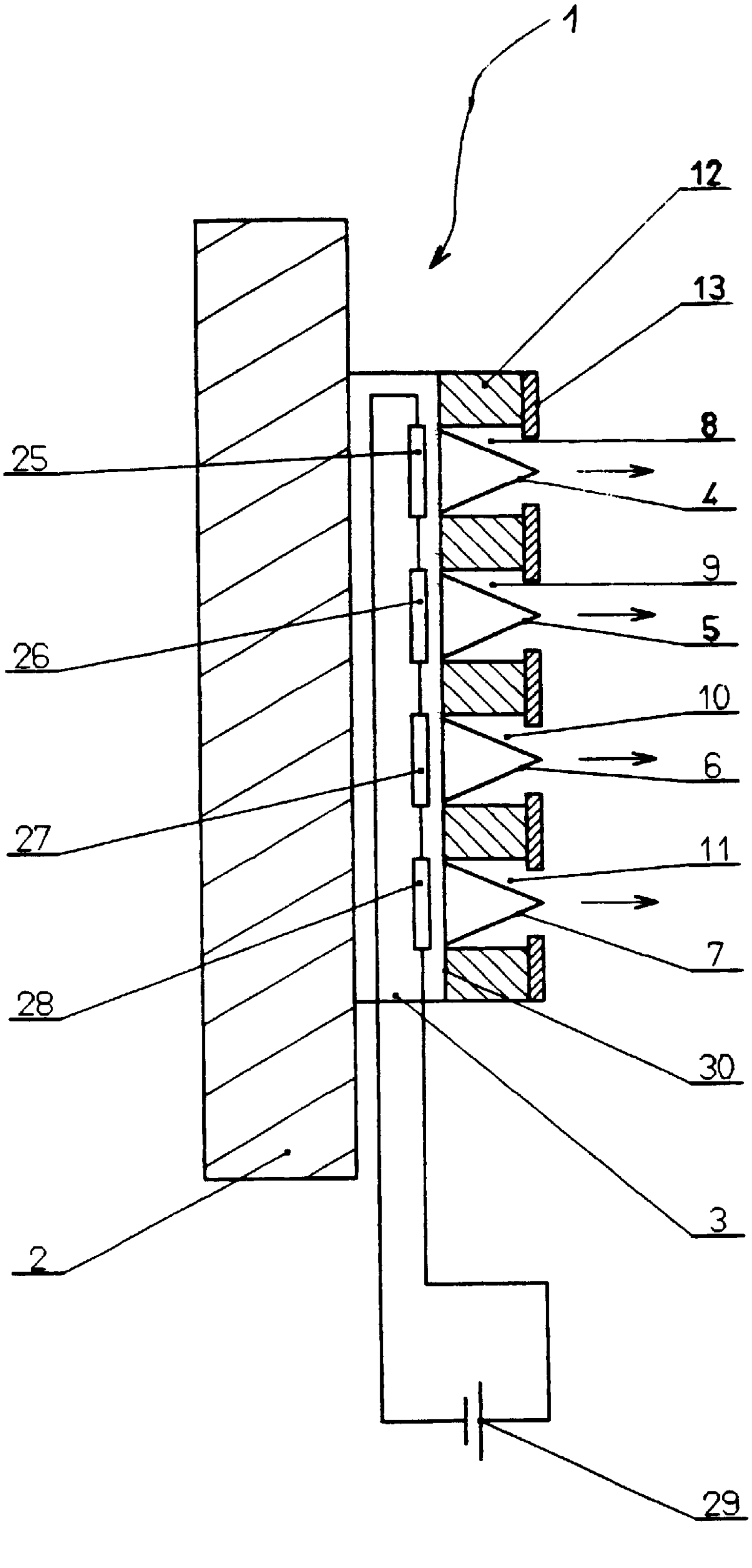
FIG. 2 is a diagrammatic sectional view of a field-emission cathode.

Referring to FIG. 2, in an embodiment of the present invention a field-emission cathode 1 includes a ceramic support 2 carrying an electrically conductive substrate 3 made of silicon, for example, or another appropriate material. The active face 30 of the substrate 3 carries an array of micropoints, such as the micropoints 4 to 7, housed in corresponding cavities 8 to 11 in an insulative layer 12, for example a layer of silicon oxide, whose outside face is covered with a conductive material forming a grid 13 with holes in line with the cavities 8 to 11. The tips of the micropoints 4–7 are flush with the surface of the grid 13.

The height and width of the cavities 8 to 11, and therefore the height and width of the micropoints 4 to 7, are in the order of one micron. Arrays of micropoints are generally formed in which the density is of the order of 10,000 to 100,000 micropoints per $mm^2$.

Figure 1:
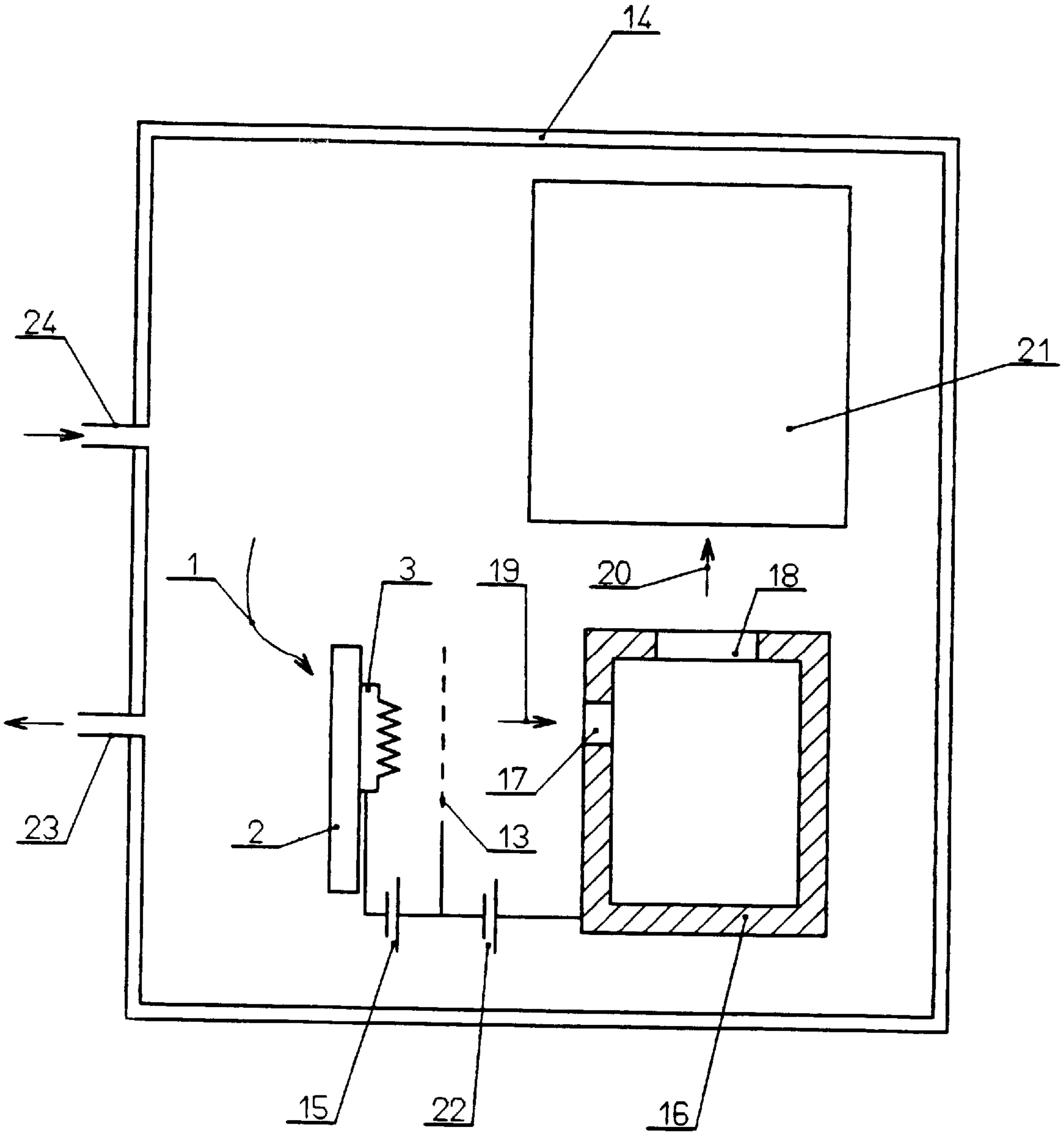
FIG. 1 is a diagram showing a field-emission cathode electron generator for use in a mass spectrometer for analyzing or detecting a gas.

FIG. 1 shows the field-emission cathode 1 housed in a vacuum enclosure 14, the support 2, the substrate 3 and the grid 13. The grid 13 is biased positively relative to the substrate 3 by an electrical grid bias generator 15.

The field-emission cathode 1 is associated with an anode 16 in the form of a box with non-magnetic material walls constituting an ionization cage and also forming a Faraday cage. The anode 16 has an entry slot 17 for electrons from the field-emission cathode 1 and an opening 18 for extracting ions formed in the internal cavity of anode 16. The arrow 19 represents the flow of electrons into the anode 16 and the arrow 20 shows the flow of ions out of the anode 16. The outflow 20 of ions is directed to a processor 21, for example a mass spectrometer, including means for discriminating and measuring ions contained in the outflow 20 of ions.

The anode 16 is biased positively relative to the grid 13 by an electrical anode bias generator 22.

The vacuum enclosure 14 has a sealed peripheral wall incorporating an extraction outlet 23 connected to a vacuum pump and an inlet 24 through which the gas to be analyzed enters. The device shown in FIG. 1 is therefore a device for detecting or measuring gases.

The flow of electrons 19 depends on the grid bias voltage produced by the electrical grid bias generator 15 and on the residual gas pressure inside the vacuum enclosure 14.

In accordance with the invention, the micropoints of the field-emission cathode 1 are heated to a temperature above ambient temperature during emission from the field-emission cathode 1 in order to reduce the grid bias voltage needed to obtain a given flow of electrons 19 for a given residual gas pressure in the vacuum enclosure 14. In other words, the invention increases the residual gas pressure inside the vacuum enclosure 14 for a given grid bias voltage and a given outflow of electrons, reducing the risk of breakdown of the field-emission cathode 1 and increasing its service life, or enabling operation at higher residual pressures. In particular, under the usual conditions of use, there can be an intermittent vacuum in the enclosure 14, i.e. a succession of vacuum steps sufficient for operation of the gas analysis or measuring device and steps at a higher pressure, for example for inserting an object to be tested or for connecting the device to a container of the gas to be analyzed. The invention speeds up analysis or measurement by enabling correct and reliable operation without having to wait for a very hard vacuum to be established in the vacuum enclosure 14.

FIG. 2 shows heater means for heating the micropoints 4 to 7 to an appropriate temperature and maintaining them at that temperature during emission of electrons. For example, the heater means comprise electrically insulated resistive heating elements 25, 26, 27 and 28 housed in the substrate 3 near the micropoints 4 to 7 and adapted to be connected to an electrical power supply.

Alternatively, the heater means can be resistive heating elements housed in the support 2 of the substrate 3 and adapted to be connected to an electrical power supply.

The electrical power supply can be a separate heating current generator 29, as shown in FIG. 2. Alternatively, the electrical power supply can be the electrical grid bias generator 15, to whose terminals the resistive heating elements 25–28 are directly connected.

The present invention is not limited to the embodiments explicitly described but encompasses variants and generalizations thereof that will be evident to the skilled person.

What is claimed is:

1. A gas detector or measuring device including a vacuum enclosure containing an anode forming an ionization cage for generating an outflow of ions, a processor for discriminating and measuring ions in the outflow of ions and a field-emission cathode with an array of electron-emitting micropoints associated with a grid and generating an incoming flow of electrons into the anode, the detector further including heater means for heating the micropoints to a temperature higher than ambient temperature and maintaining them at that temperature during emission of electrons.

2. The device according to claim 1, wherein the heater means are adapted to heat the micropoints to only a temperature greater than approximately 300° C. and to maintain them at that temperature during emission of electrons.

3. The device according to claim 1, wherein the heater means are adapted to heat the micropoints to only a temperature in a range approximately 300° C. to approximately 400° C. and to maintain them at that temperature during emission of electrons.

4. A device according to claim 1, wherein the micropoints are carried by a substrate incorporating the heater means.

5. A device according to claim 4, wherein the heater means are resistive heating elements housed in the substrate near the micropoints and adapted to be connected to an electrical power supply.

6. A device according to claim 4, wherein the heater means are resistive heating elements housed in a support of the substrate and adapted to be connected to an electrical power supply.

7. A device according to claim 5, wherein the electrical power supply is a separate heating current generator.

8. A device according to claim 5, wherein the electrical power supply is an electrical grid bias generator to whose terminals the resistive heating elements are directly connected.

9. A device according to claim 1, wherein the field-emission cathode is housed in a vacuum enclosure in which the residual gas pressure in use is greater than approximately $10^{-5}$ hPa.

10. A device according to claim 1, wherein the processor is a mass spectrometer.

11. A method of detecting or measuring gases using a vacuum enclosure containing an anode forming an ionization cage, a processor, and a field-emission cathode, said method comprising the steps of:

generating an outflow of ions at the anode;

discriminating and measuring ions of the outflow—of ions at the processor; and generating an incoming flow of electrons into the anode, wherein the field-emission cathode having an array of electron-emitting micropoints associated with a grid generates the incoming flow of electrons and wherein the micropoints are at a temperature higher than ambient temperature during emission of electrons.

12. A method according to claim 11, wherein the micropoints are at a temperature greater than approximately 300° C. during emission of electrons.

13. A method according to claim 12, wherein the micropoints are at a temperature in the range approximately 300° C. to approximately 400° C. during emission of electrons.

14. A method according to claim 11, wherein an intermittent vacuum is produced in the enclosure.

15. The device according to claim 1, wherein the vacuum enclosure has a peripheral wall comprising an inlet through which gas to be analyzed enters and an outlet.

* * * * *